(12) United States Patent
Chafni et al.

(10) Patent No.: US 9,147,128 B1
(45) Date of Patent: Sep. 29, 2015

(54) MACHINE LEARNING ENHANCED FACIAL RECOGNITION

(71) Applicant: 214 Technologies Inc., Dallas, TX (US)

(72) Inventors: Nezare Chafni, Casablanca (MA); Shaun Moore, Dallas, TX (US)

(73) Assignee: 214 Technologies Inc., Dallas, TX (US)

( * ) Notice: Subject to any disclaimer, the term of this patent is extended or adjusted under 35 U.S.C. 154(b) by 37 days.

(21) Appl. No.: 14/078,207

(22) Filed: Nov. 12, 2013

(51) Int. Cl.
*G06K 9/00* (2006.01)
*G06K 9/62* (2006.01)

(52) U.S. Cl.
CPC .......... *G06K 9/6212* (2013.01); *G06K 9/00288* (2013.01)

(58) Field of Classification Search
CPC .......... G06K 9/00221; G06K 9/00228; G06K 9/00268; G06K 9/00248; G06K 9/6232; G06K 9/00295; G06K 9/00302; G06K 2009/00328; G06K 9/00771; G06K 9/00785; G06K 9/00335; G06K 9/00308; G06K 9/00315; G06T 7/20; G06T 2207/30232
See application file for complete search history.

(56) References Cited

U.S. PATENT DOCUMENTS

| 8,275,175 | B2 | 9/2012 | Baltatu et al. | |
|---|---|---|---|---|
| 8,917,913 | B2 * | 12/2014 | Kritt et al. | 382/118 |
| 2006/0115157 | A1 * | 6/2006 | Mori et al. | 382/190 |
| 2012/0076367 | A1 * | 3/2012 | Tseng | 382/118 |
| 2012/0243751 | A1 * | 9/2012 | Zheng et al. | 382/118 |
| 2013/0121540 | A1 * | 5/2013 | Garcia et al. | 382/118 |
| 2013/0262588 | A1 * | 10/2013 | Barak et al. | 709/204 |

FOREIGN PATENT DOCUMENTS

WO    WO2007016936 A1    2/2007

* cited by examiner

*Primary Examiner* — Brian Le
(74) *Attorney, Agent, or Firm* — Dane C. Butzer (57) ABSTRACT

A technique of performing machine learning enhanced facial recognition. The technique includes accessing a facial image for a facial recognition target, performing facial recognition on the facial image, making a prediction regarding facial recognition candidates for the facial recognition target, and indicating a measure of confidence regarding the facial recognition performed on the facial image, with the measure adjusted based on the prediction. The prediction may be made based at least in part on a people model that statistically predicts the facial recognition candidates who may be present at a particular location at a particular time, a period model that predicts one or more times that the facial recognition candidates may be present at a particular location, behavioral data that indicates an intention of the facial recognition candidates to be at a particular location at a particular time, and/or actions such as purchasing tickets or registering for an event.

8 Claims, 6 Drawing Sheets

MACHINE LEARNING ENHANCED FACIAL RECOGNITION

BACKGROUND

The present disclosure generally relates to machine learning enhanced facial recognition.

SUMMARY

Aspects of the subject technology include a technique of performing machine learning enhanced facial recognition. The technique includes accessing a facial image for a facial recognition target, performing facial recognition on the facial image, making a prediction regarding facial recognition candidates for the facial recognition target, and indicating a measure of confidence regarding the facial recognition performed on the facial image, with the measure adjusted based on the prediction. The measure of confidence may be adjusted, for example by being increased for matches between facial recognition candidates who are predicted to be present at a particular location at a particular time.

In some aspects, the prediction may be made based at least in part on a people model that statistically predicts the facial recognition candidates who may be present at a particular location at a particular time, a period model that predicts one or more times that the facial recognition candidates may be present at a particular location, behavioral data that indicates an intention of the facial recognition candidates to be at a particular location at a particular time, and/or actions such as purchasing tickets or registering for an event.

In other aspects, additional steps that may be performed include but are not limited to accessing facial recognition images provided by the facial recognition candidates at the time of purchasing the tickets or registering for the event and adjusting the measure of confidence based on matches or mismatches between genders, ages, skin colors, or some combination thereof of the facial recognition target and the facial recognition candidates.

The subject technology also includes systems configured to perform the above techniques.

This brief summary has been provided so that the nature of the invention may be understood quickly. Additional steps and/or different steps that those set forth in this summary may be used. A more complete understanding of the invention may be obtained by reference to the following description in connection with the attached drawings.

DETAILED DESCRIPTION OF THE INVENTION

Briefly, techniques according to aspects of the subject technology include accessing a facial image for a facial recognition target, performing facial recognition on the facial image, and making a prediction regarding facial recognition candidates for the facial recognition target. In some aspects, the prediction may be made based at least in part on a people model that statistically predicts the facial recognition candidates who may be present at a particular location at a particular time and/or a period model that predicts one or more times that the facial recognition candidate may be present at a particular location. The model may be updated based on the indicated measure of confidence.

The subject technology utilizes artificial intelligence and machine learning to augment the results of facial recognition techniques. In some aspects, a technique is provided whereby the system attempts to identify patterns in subjects' behavior and to employ those patterns to improve the accuracy of a facial recognition technique. Subjects can include students, workers, residents, members, or other any other group of people whose automatic identification is sought.

Some aspects of the technology employ one or more advanced categorization/classification and regression techniques. These techniques estimate the relationships among variables and include many techniques for modeling and analyzing several variables. The techniques may help estimate the conditional expectation of a dependent variable given several independent variables.

The techniques may use statistical inference to find a better or best class among a group of classes of candidate identifications for a given instance of a facial image. The statistical techniques may output a probability of the person in the instance of the image being a member of each of the possible classes. Various ones of the techniques may also output "classification accuracy" values representing confidence values associated with the techniques' respective accuracies. Furthermore, many different classification and regression techniques can be used, and as such the subject technology is not limited to the aforementioned description.

In preferred aspects, the subject technology uses off the shelf facial recognition techniques that take samples of a person's face, generate a feature set from the samples, and compare the feature set with each element of a population. The elements yielding the highest comparison values above a certain confidence threshold may be candidates for the identity of the person.

Facial recognition involves attempting to match a facial identification record generated for a person (i.e., facial recognition target) with facial identification records for a group of candidates that may include the person. The facial identification records may be locally and/or remotely stored biometric information representing features of the person's and the candidates' faces. Due to inevitable differences between samples, for example caused by varying facial expressions, poses or lighting conditions, comparing different facial identification records of the same person will not always yield maximum score values. Consequently, off the shelf facial recognition techniques may produce results heavily influenced by a facial pose or varying lighting conditions, wrongly identifying a person as someone else.

A positive match is normally produced if the confidence rate returned by facial recognition techniques exceeds a confidence threshold. The threshold typically is dependent on the False Acceptance Rate (FAR) and the False Rejection Rate (FRR) and can be a hard coded number. Alternatively, the threshold can be computed using various statistical measures (ex: average confidence rate of correctly identified instances).

According to some aspects of the subject technology, the threshold and/or confidence rate may be adjusted based on various statistical techniques. These adjustments are intended to improve the accuracy of the facial recognition process.

For example, statistical techniques may be used to increase the likelihood of a positive match for a person triggering the system with a positive probability of being present at a particular time. Applying these techniques may make the difference between a positive and a negative match if the confidence rate is close to but below the threshold. These techniques are intended to help overcome the limitations of certain facial recognition processes related to varying poses and differences in lighting.

In more detail, due to varying poses, a person triggering the system could produce a relatively lower confidence rate that ends up being below the threshold. However, if the person has a high probability of showing up at a particular time (e.g., time or day and/or day of week), techniques according to some aspects of the subject technology may augment the confidence rate, increasing the probability of a positive match.

In more general terms, aspects of the subject technology involve identifying patterns in people's behavior. For example, in scenarios such as facial recognition at schools and workplaces, people tend to show up around the same periods and on the same days of the week. People also may develop statistically significant habitual patterns when visiting anywhere else that check-in may be required. For example, behavior of people visiting locations such as gyms, yoga studios, and fitness centers may also be habitual because people tend to develop routines that regulate their workout schedules. Behavior of people visiting other places may likewise follow certain statistically significant patterns.

Aspects of the subject technology may use various models to represent statistically significant behavior of people whose images are to be subject to facial recognition. Three examples of these models follow:

Model 1, called the "People Model" herein, is based upon performing the following: "List all individuals with a probability of showing up in this period and day of the week." This can be rephrased as asking, "For a given period and day of the week, which individuals could show up and what is the probability for each"? In some aspects, multiple People Models may be used. For example, People Models may be divided based on gender, with one People Model for males and one People Model for females. Other characteristics besides gender may be used to divide the People Models.

Model 2, called the (time) "Period Model" herein, is based upon performing the following: "For a given name and day of the week, list all periods that this person could show up in."

Model 3, called the "Event Model" herein, is based upon performing the following: "Based on a timing and/or manner in which people purchased tickets or otherwise registered for an event, list who is likely to show up during time periods of interest, during what time periods people of interest are likely to show up, or both."

The first two models may be constructed by processing visit data that include the name, period of arrival, and day of the week for people visiting a location. The third model may be constructed by processing information provided by people, for example when purchasing tickets or otherwise registering for an event via phone, in person, online, or through a mobile device "app."

In preferred aspects, the first model returns a list of names along with their probabilities, and the second model returns a list of periods and their probabilities. The third model may return one or both of these types of lists. The models preferably also return their respective classification accuracy.

The subject technology is not limited to the foregoing models. Other models may be used, and some of these models may use other data instead of visit data and/or information provided by people.

Figure 1:
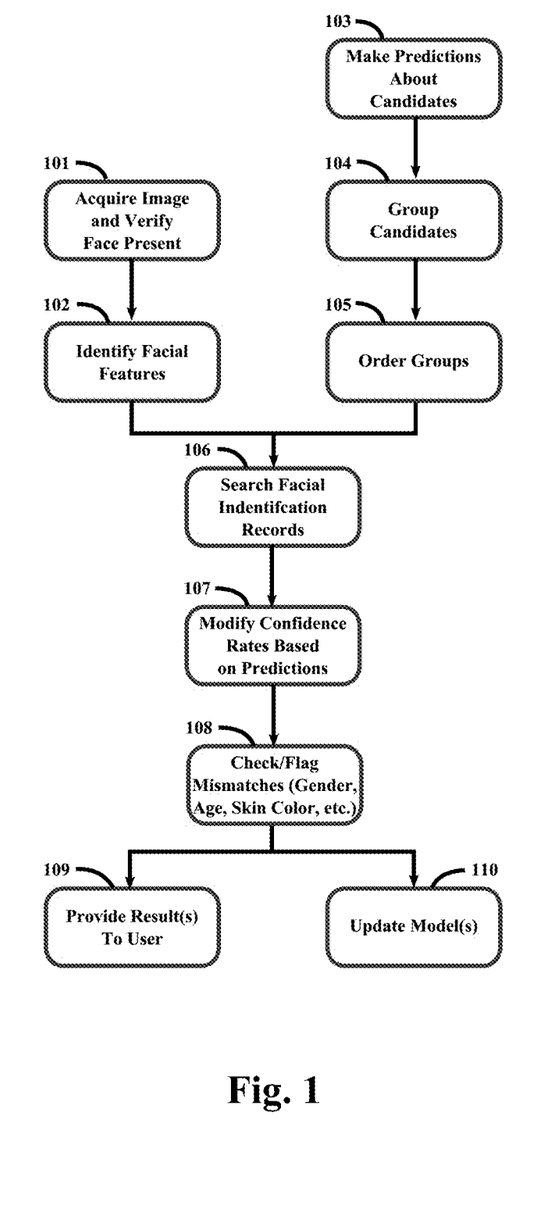
FIG. 1 illustrates an overview of a technique for machine enhanced facial recognition according to some aspects of the subject technology.

FIG. 1 illustrates an overview of a technique for machine enhanced facial recognition according to some aspects of the subject technology. The technology is not limited to the technique illustrated in FIG. 1.

In step 101, a facial image of a target person for facial recognition processing is acquired. Preferably, the presence of a face in the image is verified. In step 102, facial features of the face in the image are recognized.

Before, during, and/or after steps 101 and 102, predictions are made about candidates for the facial recognition target. The predictions may take many forms. Examples include but are not limited to predictions regarding who is likely to show up at a particular location during time periods of interest, during what time periods people of interest are likely to show up at the location, and whether or not people of interest are likely to show up at the location.

Preferably, the predictions are based on one or more models. The models in turn preferably are based on people's past behavior, people's indicated intentions of future behavior, or both. For example, the "People Model" and the "Period Model" are examples of models based on past behavior. The "Event Model" is an example of a model based on indicated intentions of future behavior. The indicated intentions may be based on detected patterns in behavioral data, inferred from single events such as purchasing a ticket or scheduling an appointment, or determined in other ways. In some aspects, the models may be "trained" for at least some period of time or with some amount of information before being used.

The predications may be used to group facial recognition candidates in step 104, and those groups may be ordered in step 105. In some aspects, predictions may also be grouped based on gender and/or some other easily determined characteristic(s) of the candidates. The ordering and/or grouping may be performed in order to try to increase efficiency when searching facial identification records of the facial recognition candidates for one or more matches with the facial features identified in step 102. This search is performed in step 106.

If one or more potential matches are found during the search in step 106, confidence rates for the matches may be modified in step 107 based on the predictions. This step may be performed in an attempt to decrease misidentifications (e.g., FARs and FRRs) and increase proper identifications.

In step 108, mismatches between certain easily identified features of the face in the image and the potential matches may be flagged. Examples of such easily identified features include but are not limited to age, gender, skin color, and possibly eye and hair color. Flagged mismatches may be used to disqualify a potential match or to reduce a confidence rate for the potential match.

Results of the foregoing processes are provided to a user or otherwise used in step 109. The results may take various forms. For one example, the results may include potential matches and confidence rates for those potential matches. For another example, the confidence rates for the potential matches may be compared, and the results may include the potential match with the highest confidence rate. For yet another example, the confidence rates may be compared to a threshold to determine likely correct matches.

In step 110, the results of the process preferably are used to update the models. Thus, the models and hence the predictions based on the models are likely to become more accurate over time.

Figure 2:
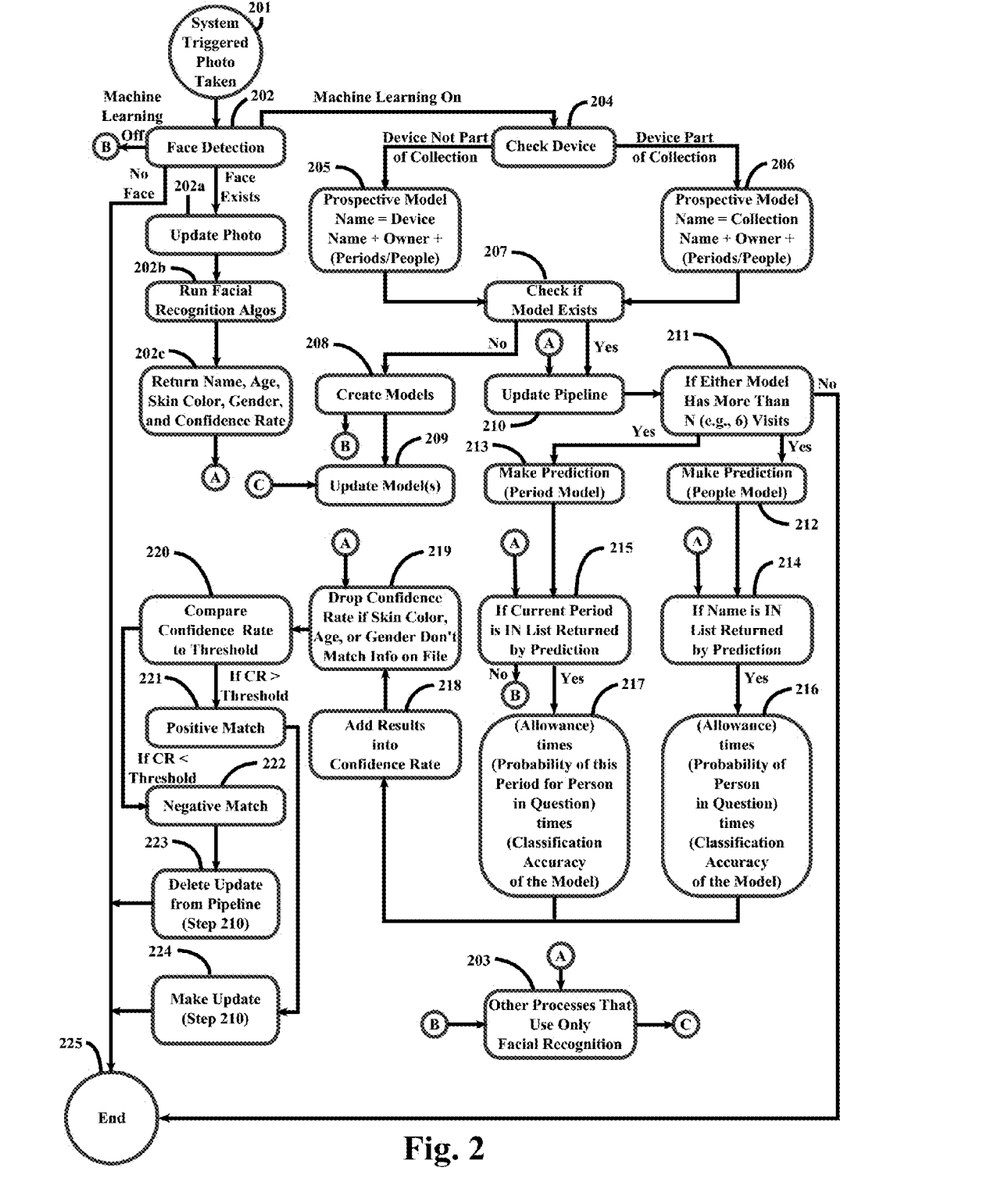
FIG. 2 illustrates a technique for machine enhanced facial recognition according to some aspects of the subject technology.

FIG. 2 illustrates details of one possible technique for machine enhanced facial recognition according to some aspects of the subject technology. The technology is not limited to the technique illustrated in FIG. 2. The technique illustrated in FIG. 2 includes indicating a measure of confidence regarding the facial recognition performed on the facial image, with the measure adjusted based on the prediction. The adjustment may incorporate machine learning.

According to some aspects, once machine learning has augmented the measure of confidence, different flags may be checked that could highlight a mismatch between the data collected from facial recognition and information that is stored on file for the facial recognition target. For example, the measure of confidence may be adjusted based on matches or mismatches between genders, ages, skin colors, other identifying factors, or some combination thereof between the facial recognition target and the facial recognition candidates. This adjustment may take the form of application of a percentage change or any suitable formula. Preferably, a quality of the image of the facial recognition target is incorporated into this adjustment. For example, the amount of adjustment applied for mismatches may be decreased or even eliminated if the image is of poor quality as measured by detected brightness, blurring, and/or other image artifacts.

The technique illustrated in FIG. 2 may compare a resulting confidence rate to a threshold. Thus, the adjustment of the confidence rate may increase a chance for an accurate result and decrease a chance for an inaccurate result.

A system that performs the technique illustrated in FIG. 2 may include an image capture device or devices. Several such devices working together are termed a "collection" in the figure. Some image capture devices in a collection may track entry into an area, exit from an area, and the like. The devices may be placed at different angles or entry/exit points. For example, a classroom that has several entries may be observed with a collection of image capture devices. The data from those devices may be aggregated, duplicate faces may be eliminated, and the results may be presented or processed in a table or other compiled format.

In terms of models for making predictions, each device may have its own model. Alternatively, if several image capture devices are part of a collection, the entire collection may have its own model.

In more detail, flow begins in step 201 of FIG. 2. The machine learning enhanced facial recognition process may be triggered by an image capture device or collection sensing motion or detecting a face in an image or video feed. Alternatively, a simple button press by a security guard or other person may trigger the process. The process may be triggered in other ways as well.

In step 202, face detection is performed on the picture if necessary. However, such may not be necessary. For example, if the trigger prompting step 201 was detecting a face in a captured image or video feed, then face detection has already been performed.

If and when a face for a facial recognition target has been detected, an image containing the face is uploaded in step 202a. For example, the image may be uploaded to a computing device that performs a machine learning enhanced facial recognition technique according to some aspects of the subject technology. In some aspects, the computing device may be a laptop computer, a desktop computer, a mobile computing device such as a smart phone or tablet computer, a server, a part of a cloud computing system, or any other form of computing device.

Facial recognition is performed on the image in step 202b without machine learning according to some aspects of the subject technology. Preferably, one or more off-the-shelf facial recognition algorithm(s) are used in this step. Of course, the facial recognition in step 202b may use other types of machine learning, if such exists.

Facial recognition occurs in step 202b regardless of whether a machine learning feature is off or on. In step 203c, results such as name, skin color, gender, estimated age, and a confidence rate are returned. These results are provided to other steps in the technique as denoted by the circled "As" in FIG. 2.

If no face is detected in step 202, flow proceeds to step 225 and ends.

Use of machine learning may be optional. For example, permission of a user of a system that performs the facial recognition technique may be required. If machine learning is turned off, flow proceeds to step 203 as indicated by the circled "Bs" in FIG. 2. In step 203, operations may be performed on the facial recognition results from step 202c without machine learning. The results of these operations may be provided to other steps in the technique as denoted by the circled "Cs" in FIG. 2.

If machine learning is turned on, flow proceeds to step 204. This step checks whether the device that captured the facial image being processed is operating alone or as a part of a collection. In preferred aspects, each device has its own model if it is not part of a collection, and each collection has its own model.

Flow proceeds to step 205 if the image capture device is not part of a collection. In some aspects, the models associated with the device are designated by a combination of DeviceName+Owner(Full)Name+ModelType. Flow instead proceeds to step 206 if the image capture device is part of a collection. In some aspects, the models associated with the collection are designated by a combination of CollectionName+Owner(Full)Name+ModelType. ModelType may be "People," "Periods," "Events," or some other model type.

A search is performed in step 207 to see if models with the associated designations exist. If the models do not exist, the models are created in step 208. For example, if the device is not part of a collection, models with the designations DeviceName+Owner(Full)Name+People and DeviceName+Owner(Full)Name+Periods are created. If the device is part of a collection, models with the designations CollectionName+Owner(Full)Name+People and CollectionName+Owner(Full)Name+Periods are created.

Both the People and the Periods models preferably involve time periods. In some aspects, a limited number of time periods (e.g., 7) are designated for the sake of simplicity. For example, the time periods might be early morning, mid-morning, late morning, early afternoon, late afternoon, early evening, and later evening. Days and/or date may also be included in the models. The models also preferably include an indication of estimated classification accuracy, which may be determined experimentally or through mathematical approximation.

The created models are input to step 203, as indicated by the circled "B" exiting step 208. Because the models have just been created, they are not yet ready for use. The models are therefore updated in step 209 based on information from step 203, as indicated by the circled "C" entering step 209. For example, updates of the following form may be applied to the models:

People Model update: "Person_Name,Wednesday, Early_Morning"

Periods Model update: "Early_Morning,Wednesday,Person_Name"

If the models are new or do not have sufficient entries to be considered usable, the updates are incorporated into the models upon a positive match confirmation generated by processes that do not use machine learning (e.g., step 203). If one or more of the models exist and have sufficient entries to be considered usable, the processing pipeline is updated with visit information for the facial recognition target in step 210 pending confirmation of a positive match in step 220. If a positive match is confirmed, the information for the update preferably is received from step 202c as indicated by the circled "A" entering step 210. This update preferably is applied to all models being used and possibly to other models if such exist.

As a result of flow up to step 210, the models will accumulate updates about people who have been recognized and when they were recognized. This may be considered to be training of the models. Thus, machine learning may be considered to take place at least in part in step 210.

In step 211, a check is made to see if either model has been accumulated at least N such updates and therefore is ready to be used. For example, a model may be considered ready for use if the model has been updated 6 times.

If neither model is ready for use, flow proceeds from step 211 to step 225 and ends. The technique may continue to be trained and even may be used for facial recognition (e.g., without machine learning according to the subject technology) until at least one of the models is ready for use. On the hand, if the People Model is ready, flow proceeds to step 212. Likewise, if the Period Model is ready, flow proceeds to step 213. Both of these steps may be executed if both models are ready.

In step 212, a prediction is made based on the People Model. The prediction indicates those people with a possibility of showing up in the relevant period, which may be the period that the facial image was acquired. If the system is operating in real-time, then the relevant period is the current period. This step makes the prediction based on the relevant period. The result of the prediction is a list of names along with their associated probabilities and the classification accuracy of the model.

In step 213, a prediction is made based on the Period Model. The prediction indicates the probability of the relevant period being one in which the named person is likely to show up. Again, the relevant period may be the period that the facial image was acquired. If the system is operating in real-time, then the relevant period is the current period. This step makes the prediction based on the name and day. The result of the prediction is a list of periods along with their associated probabilities and the classification accuracy of the model.

Flow proceeds from step 212 to step 214. This step receives at least the name from facial recognition that occurs in step 202b and is returned by step 202c as indicated by the circled "A." If the name is in the prediction based on the People Model, flow proceeds from step 214 to step 216.

Flow also proceeds from step 213 to step 215. This step compares the period when the facial image was acquired with the prediction based on the Period Model. The period when the facial image was acquired may be provided by step 202c as indicated by the circled "A." Alternatively, if the technique is being performed in real-time, the current period may be used. If the period when the facial image was acquired is in the prediction based on the Period Model, then flow proceeds from step 215 to step 217. Otherwise, flow proceeds to step 203 for processing based on the facial recognition results returned by step 202b as indicated by the circled "B."

In step 216, the probability of the named person showing up during the relevant period is multiplied by an allowance allocated for People Model and by the estimated classification accuracy. In step 217, the probability of the relevant period being one in which the named person is likely to show up is multiplied by an allowance allocated for the Period Model and by the classification accuracy of the model. The results of either or both of steps 216 and 217 are incorporated into the confidence rate for the recognition performed in step 202b returned by step 202c. The results may be incorporated by being added to the confidence rate or through application of any suitable technique.

In some aspects, flow from step 212 through 214 to 216 and from step 213 through 215 to 217 proceeds in parallel. Alternatively, the steps may be performed sequentially, for example in order (i.e., 212, 213, 214, 215, 216, and then 217), from step 212 through 214 to 216 and then from 213 through 215 to 217, or in some other order.

A comparison is made in step 219 between information on file for the named person and easily detected features from the acquired facial image. For example, the confidence rate may be decreased if the skin color, age, and/or gender on file do not match the acquired facial image. Other features such as eye color, hair color, and the like may also be used. Different amounts of decrease may be applied based on the persistence of the feature. For example, people sometimes change their hair color, so a smaller decrease (or no decrease) may be applied based on a mismatch regarding hair color. However, except in the case of rare medical conditions or significant environmental and/or cosmetic influences, people's observable skin color rarely changes, so a larger decrease may be applied based on a mismatch regarding skin color. The decrease(s) may be applied by subtracting a fixed value, multiplying by a percentage, or performing some other operation. Mismatches may also be flagged.

The resulting confidence rate for the named person being the person's whose face is in the acquired image is compared to a threshold in step 220. If the comparison indicates a positive match, flow proceeds to step 221 where the result is provided to a user, a computing device for further processing, or otherwise used. Flow then proceeds to step 224, where the associated update is applied to the pipeline in step 210. If the comparison indicates a negative match, flow proceeds to step 222, where that result may be used. Flow then proceeds to step 223, where the associated updated is deleted from the pipeline in step 210. In some aspects, a confidence rate for the models may be updated programmatically as the models accumulate updates and get more or less accurate as indicated by positive and negative matches. Flow ends in step 225.

While aspects of the subject technology discussed with respect to FIG. 2 use a People Model and a Period Model, other models may be used. In addition, one model may be used, or more than two models may be used. Furthermore, new models may be added or derived from existing models, and existing models may be retired.

Figure 3:
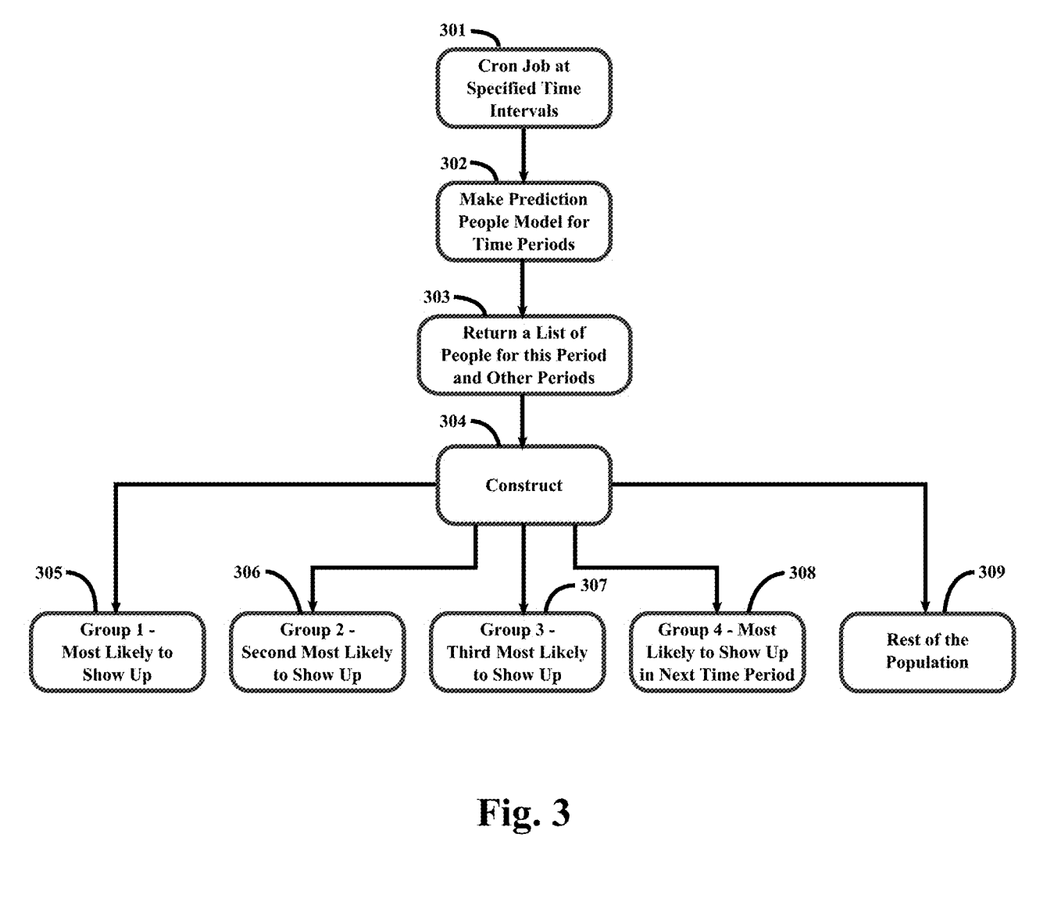
FIG. 3 illustrates one possible technique for grouping facial recognition candidates that may be used in the technique illustrated in FIG. 2.

FIG. 3 illustrates one possible technique for grouping facial recognition candidates that may be used in the technique illustrated in FIG. 2, for example in step 202b. The grouping preferably uses models that are updated with machine learning techniques, for example as in step 210 in FIG. 2.

A common problem often encountered with facial recognition is inefficiency. Namely, facial recognition systems often inefficiently sift through thousands if not millions of FIRs (facial identification records). Machine learning according to some aspects of the subject technology may be used to decrease inefficiency by grouping and ordering expected candidates for a person in an acquired image based on their probability of triggering the system. For example, grouping may be based on the candidates being students, employees, shoppers, or the like. For another example, grouping may be based on gender and/or some other easily determined characteristic(s) of the candidates.

Aspects of such grouping according to the subject technology may use the People Model described above with respect to FIG. 2 to make predictions for every period in advance. The resulting information, for example a list of expected attendees at a location for a relevant period, may be used to construct groups ranging from the most likely to show up to the least likely to show up.

The grouping process may be triggered in numerous manners. As a first example, a time triggered process such as a "cron job" may be used to trigger construction of the groups at the beginning of a day, at the beginning of every possible period, and/or at any other specified time interval. ("Cron" is a time-based job scheduler in Unix-like computer operating systems that can be used to schedule jobs to run periodically at fixed times, dates, or intervals.) As a second example, a user could trigger construction of the groups.

Aspects of this technique involve comparing a confidence rate to two thresholds, the Candidate Threshold and the Confirmation Threshold. The Candidate Threshold may be used by facial recognition techniques when searching a database to return a candidate from a group. The Confirmation Threshold may be used to determine a positive match between a candidate and an acquired facial image, for example as occurs in step 220 in FIG. 2.

The technique illustrated in FIG. 3 is triggered in step 301, for example by a "cron" job. Other triggers may be used. A prediction call is made in step 302 for every period using the People Model. Information sent for processing based on the People Model may be the following:

period 1: period, day (e.g., early_morning, Wednesday)
period 2: period, day (e.g., morning, Wednesday)
period 3: period, day (e.g., noon, Wednesday)
period 4: period, day (e.g., afternoon, Wednesday)
and so on for every period or at least several possible periods.

A list of candidate people predicted to show up in each period is returned in step 304 along with their probabilities. For example, returned information may resemble the following:

period 1 [{u'score': 0.00033300000000000002, u'label': u'shaun'}, {u'score': 0.33227800000000002, u'label': u'youssef'}, {u'score': 0.0000999000000000001, u'label': u'nezare'}, {u'score': 0.265822, u'label': u'chris'}, {u'score': 0.00116599999999999999, u'label': u'mounir'}, {u'score': 0.39873399999999998, u'label': u'gaith'}, {u'score': 0.00066600000000000003, u'label': u'guy'}, {u'score': 9.9999999999999995e07, u'label': u'abdel'}]

Several groups may be constructed using the returned information. The groups may be defined based on a group size (e.g., 100 people groups), based on percentages, based on gender, and/or based on any other grouping technique. Groups can include candidates expected to show up in a next period, in other periods, in a combination of periods, in a specific period, in a specific time interval, or the like. In the example in FIG. 3, the predicted people are classified into the following groups represented by boxes 305 to 309:

305 Group 1: People most likely to show up during the relevant period;
306 Group 2: Second most likely people to show up during the relevant period;
307 Group 3: Third most likely people to show up during the relevant period;
308 Group 4: Most likely people to show up during a next period or time interval; and
309 Rest of the population (i.e., remaining candidates in a database of facial identification records).

Figure 4:
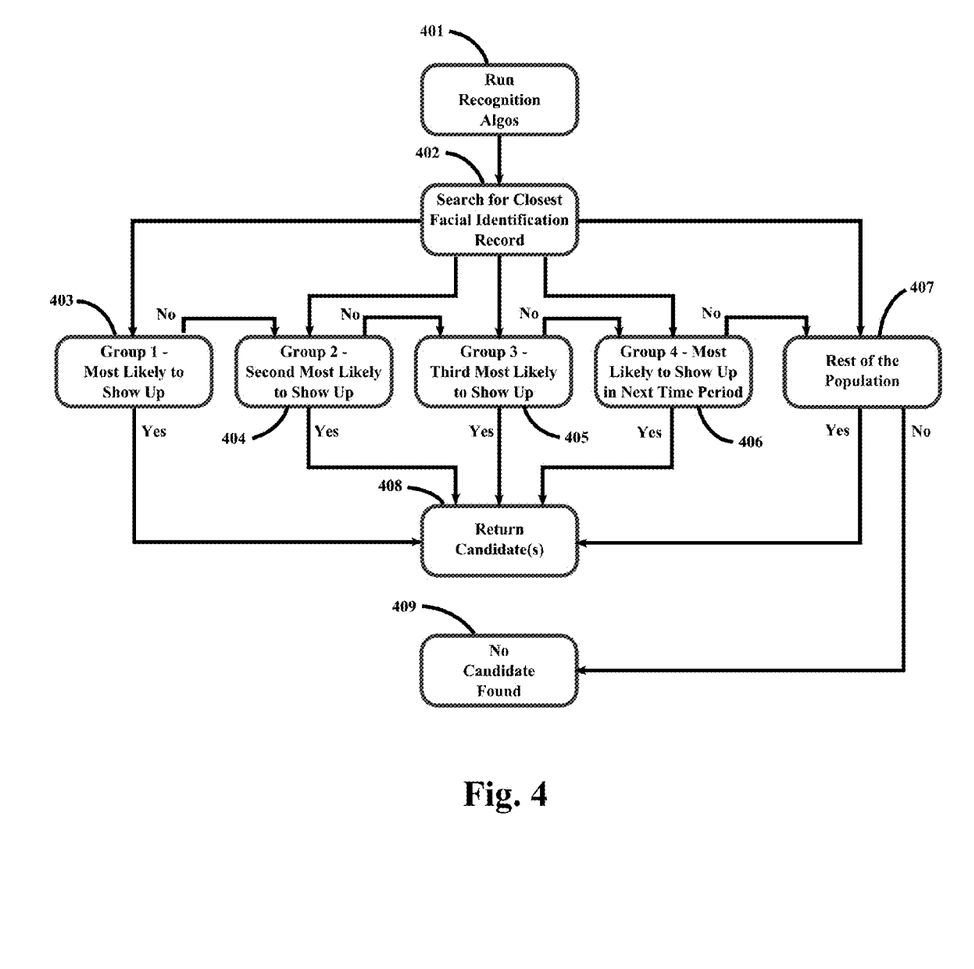
FIG. 4 illustrates one possible technique for determining candidate recognized people based on grouped facial recognition candidates that may be used in the technique illustrated in FIG. 2.

FIG. 4 illustrates one possible technique for determining candidate recognized people based on grouped facial recognition candidates that may be used in the technique illustrated in FIG. 2, for example in step 202*b*. The example illustrated in FIG. 4 uses the grouping performed in the example illustrated in FIG. 3. However, the technique illustrated in FIG. 4 may be adapted to other numbers and types of groupings.

Facial recognition techniques are run in step 401 in response to a trigger, for example motion detection, a facial image detected in an image stream, a user manually triggering the technique, or the like. In step 402, a search for the closest facial identification record starts. The search begins with step 403 in Group 1 (judged most likely group to show up during the relevant time period). If a candidate returns a score above the Candidate Threshold, flow proceeds to step 408. If no candidate returns a score above the Candidate Threshold, a next group is searched.

The technique proceeds to search successive groups until a candidate's score is found that is above the Candidate Threshold: Group 2 (second most likely people to show up during the relevant period) is searched in step 404; Group 3 (third most likely people to show up during the relevant period) is searched in step 405; Group 4 (most likely people to show up during a next period or time interval) is searched in step 406; and the rest of the population (i.e., remaining candidates in a database of FIRs) is searched in step 407. If a candidate's score exceeds the Candidate Threshold during any of the searches, flow preferably proceeds to step 408 instead of to the next search. Alternatively, flow may proceed both to step 408 and also to the next search.

In step 408, then the candidate's score and preferably extracted information such as age, gender, and skin color are returned in step 408 for use by the other functions and techniques. The score may be used as an initial confidence rate for a search technique such as the one illustrated in FIG. 2. In addition, because facial recognition is performed in the technique illustrated in FIG. 4, results of the search may be stored and then used in a later technique. For example, if the technique illustrated in FIG. 4 is used in conjunction with the technique illustrated in FIG. 2, then stored results could be retrieved in step 202 instead of facial recognition being performed again. Alternatively, facial recognition may be performed independently in each technique, possibly using different processes.

If no candidate returns a score above the Candidate Threshold after all of the groups are searched, then no candidate is found, and flow proceeds to step 409 where that result may be returned. Alternatively, in order to further reduce workload, flow may proceed to step 409 after an earlier search, which may avoid searching an entire FIR database for the sake of a quicker result.

One possible enhancement to the technique illustrated in FIG. 4 may be used in a case that the person whose image has been acquired is attempting to confirm his or her identity.

Under such a scenario, the searching could continue among the groups even after a candidate's score is above the Candidate Threshold. Continuing to search might return a higher scoring result, which may permit confirmation of a person's identity despite a misidentification from a more likely group of candidates. For example, flow might proceeds from some or all of steps 403 to 406 to both step 408 and to step that searches the next group (e.g., 403 to 404, 404 to 405, etc.) even when a candidate returns a score above the Candidate Threshold. In some aspects, this process may stop upon confirmation of the person's identity. This enhancement may be used in other scenarios as well.

In some aspects, two or more candidates may return the same otherwise highest score. In the event of such ties, the candidates may both be presented as possible matches, a request may be generated for another form of identification, and/or a warning indicating the possibility of an inaccurate facial identification record or a false identity may be raised. Other responses may be implemented as well.

In other aspects of the subject technology, models and predictions may be made based at least in part on actions by people who indicate an intention to be at a particular location at a particular time. Examples include purchasing tickets or registering for an event such as a sporting, commercial, or artistic event, a vacation (e.g., flights and hotels), or the like. Machine learning and grouping can be applied to these models and facial recognition techniques that use these models.

One such technique involves using an "Event Model" based on information regarding ticket purchasers' ages, genders, distances to an event venue (e.g., calculated from their address), timing of ticket purchases (e.g., 1 hour, 2 hours, 3 hours, etc. from when tickets became available), other factors related to an expressed intention, and/or some combination or subset thereof. This information may be considered independent variables, and predictions of periods during which people are likely to arrive may be considered dependent variable.

The technique uses such information to detect and identify patterns that will help predict behavior of facial recognition candidates. For example, timing of when a person purchased a ticket may indicate how eager the person is to attend an event. A person who purchased his or her ticket immediately after the ticket became available is most likely to be keener to attend and may be likely to show up relatively earlier than other people. The technique further may group and order expected attendees based on prediction(s) of periods during which people are likely to show up. For example, facial recognition candidates may be grouped as likely to show up during the first hour after "doors open," the second hour, the third hour, etc. Other periods may be used, for example before "doors open" in a case that facial images can be acquired from outside an event (e.g., via security cameras).

Such grouping may permit facial recognition and machine learning techniques to occur more efficiently, possibly reducing people's wait times (e.g., shorter lines, seamless check in, etc.). The grouping and ordering may also permit or assist event organizers with making decisions such as staffing, marketing, and operational decisions.

The machine learning techniques may be trained with information from past events as well as streaming updates. In addition, categories used in making the predictions may be weighted to reflect correlations between any categories and/or results.

In more detail, this technique uses machine learning models, for example of the type discussed with respect to FIG. 1, to make predictions in advance regarding who is likely to show up during different periods. The returned information may then be used to construct groups using a technique akin to the one described with respect to FIG. 3. For example, the groups may range from people most likely to show up during a particular period to least likely to show up during that period. In some aspects, the constructed groups may only include people in a database of those who have purchased tickets for or otherwise registered for an event.

In terms of groups such as those illustrated in FIGS. 3 and 4, Group 1 may include candidates most likely to show up in a current time period, Group 2 may include candidates next most likely to show up in the time period, etc. Facial recognition candidates may be checked group by group, for example as discussed with respect to FIG. 4.

The source of recognition candidate's facial images may vary. If facial recognition is used to complement or replace conventional tickets, the purchaser may be prompted to take or to provide his or her picture while purchasing a ticket or registering for an event on the event organizer's website, on a third party website, using a mobile device app, or the like. The picture may allow the purchaser to use his or her face instead of a ticket when checking in at the venue. Other sources for candidates' facial images may include but are not limited to social media, customer relationship management databases, past events, and other databases.

Alternatively, a facial image of a person may be acquired when the person presents his or her ticket or otherwise checks into an event. The scanned photo may then be associated with an account for the person who purchased the ticket or registered for the event. Mismatch flags may be checked before associating the image with the person. These flags may be based on gender, age, skin color, and the like. For example if the gender of a person who purchased a ticket is male, and facial recognition techniques estimate that the person checking in is female, then the image preferably is not associated with an account for the person. However, if no mismatch is present, then the image preferably is associated with the account.

Figure 5:
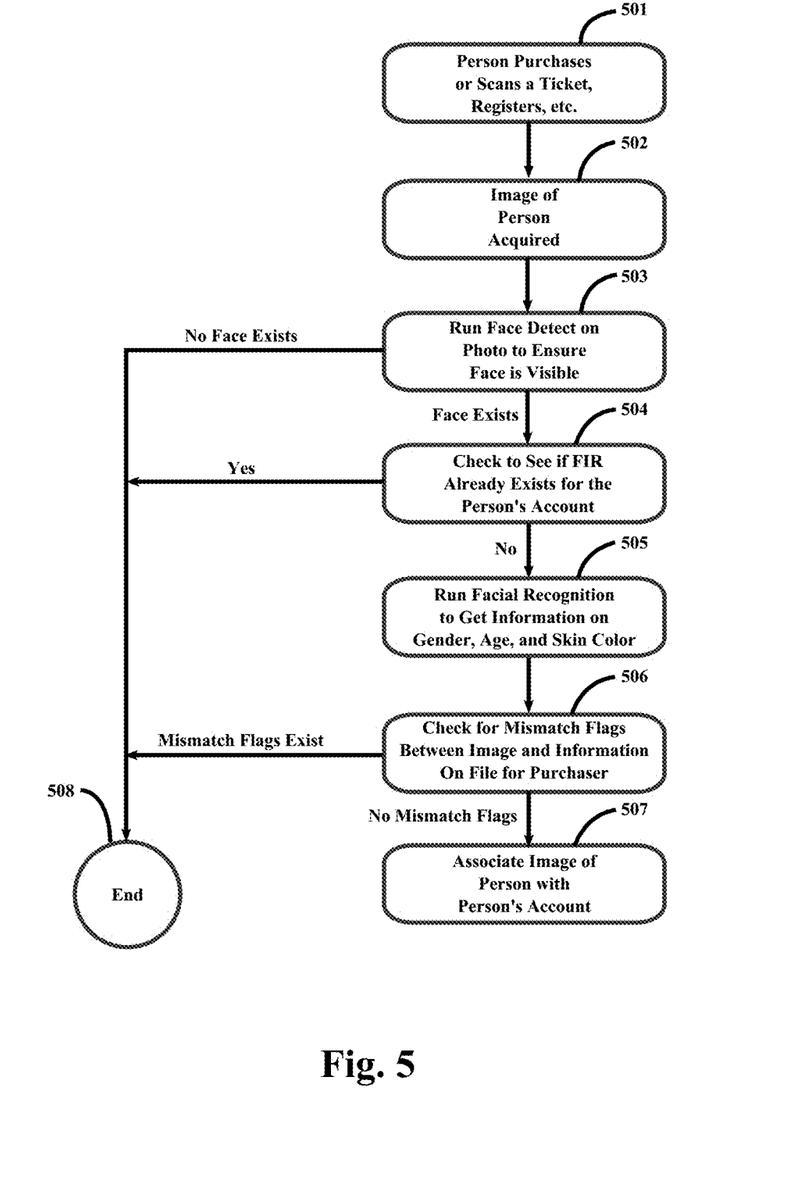
FIG. 5 illustrates one possible technique by which an image of a person who purchases a ticket or otherwise registers for an event may be associated with an account for that person according to some aspects of the subject technology.

In more detail, a technique by which an image of a person who purchases a ticket or otherwise registers for an event may be associated with an account for that person is illustrated in FIG. 5. In step 501, a person purchases a ticket, scans a ticket when showing up for an event, and/or otherwise registers for an event. An image of the person is acquired in step 502. For example, a person may be instructed to provide his or her image, the person may be requested to take their own picture using a camera that is part of or connected to a computer or mobile device, the person's image may be captured at a self-service check-in window or kiosk, or an event staff member at an event may acquire the person's image when the person shows up.

Face detection is performed on the image in step 503. If no face is detected, flow proceeds to step 508 and ends. If a face is detected, an account associated with the person is checked to see if a facial identification record already exists for the person. If one does not exist, flow proceeds to step 505. Otherwise, flow proceeds to step 508 and ends. Alternatively, flow could still proceed to step 505 in order to update the account.

In step 505, facial recognition is performed on the image from step 502 to determine information such as gender, age, and skin color. Other information may also be determined. A check is made in step 506 for a mismatch between this information and information on file for the person. If no mismatch is detected, the image of the person from step 502 preferably is associated with an account for that person in step 507. If a mismatch is detected, flow proceeds to step 508 and ends.

Steps 506 to 508 may use "mismatch flags" or some other technique for controlling the flow between them. If flags are used, those flags may be made available to other techniques such as the one illustrated in FIG. 2.

Figure 6:
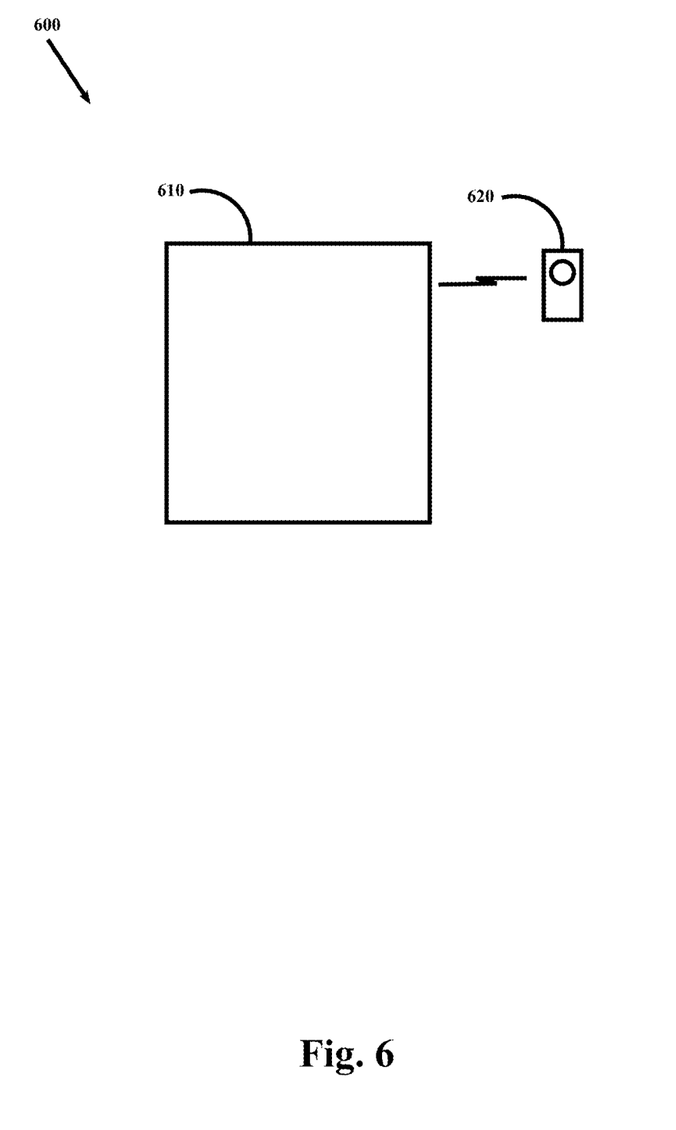
FIG. 6 illustrates a block diagram of a system that may be used to implement aspects of the subject technology.

FIG. 6 illustrates a block diagram of system 600 that may be used to implement aspects of the subject technology. Computing device 610 includes at least some tangible computing elements. For example, computing device 610 may be a laptop computer, a desktop computer, a mobile computing device such as a smart phone or tablet computer, a server, a part of a cloud computing system, or any other form of computing device. Computing device 610 performs processes such as those described above, either alone or in conjunction with one or more other computing devices. System 600 preferably includes or accesses storage for instructions used to perform the processes as well as data such as images, facial identification records, and/or behavioral data for people on which the processes may be performed. FIG. 6 also illustrates image capture device 620 that may be used to capture such images. The image capture device may be part of computing device 610 or may provide images to the computing device. The images may be sent or provided to computing device 610 through an interface, via storage, through one or more other computing devices, or some combination thereof.

The invention is in no way limited to the specifics of any particular embodiments and examples disclosed herein. For example, the terms "aspect," "example," "preferably," "alternatively" and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Steps may be performed serially, in parallel, in a pipelined manner, or in different orders than disclosed herein. Thresholds may be inverted and scores may be compared to thresholds in other manners than looking for scores above thresholds. Many other variations are possible which remain within the content, scope and spirit of the invention, and these variations would become clear to those skilled in the art after perusal of this application.

What is claimed is:

1. A system that performs machine learning enhanced facial recognition, comprising:
   an image capture device;
   at least one computing device including at least tangible computing elements that perform steps comprising:
   accessing a facial image for a facial recognition target;
   performing facial recognition on the facial image;
   making a prediction regarding facial recognition candidates for the facial recognition target; and
   indicating a measure of confidence regarding the facial recognition performed on the facial image, with the measure adjusted based on the prediction;
   wherein the prediction is based at least in part on actions by the facial recognition candidates that indicate an intention to be at a particular location at a particular time, the prediction is based at least in part on behavioral data that indicates an intention of the facial recognition candidates to be at a particular location at a particular time, or the facial recognition is performed using facial images provided by one or more of the facial recognition candidates at the time of purchasing a ticket or registering for an event.

2. A system as in claim 1, wherein the prediction is based at least in part on the actions by the facial recognition candidates that indicate the intention to be at the particular location at the particular time.

3. A system as in claim 1, wherein the prediction is based at least in part on the behavioral data that indicates the intention of the facial recognition candidates to be at the particular location at the particular time.

4. A system as in claim 1, wherein the facial recognition is performed using the facial images provided by the one or more of the facial recognition candidates at the time of purchasing the ticket or registering for the event.

5. A method of performing machine learning enhanced facial recognition, comprising:
   accessing a facial image for a facial recognition target;
   performing facial recognition on the facial image;
   making a prediction regarding facial recognition candidates for the facial recognition target; and
   indicating a measure of confidence regarding the facial recognition performed on the facial image, with the measure adjusted based on the prediction;
   wherein the prediction is based at least in part on actions by the facial recognition candidates that indicate an intention to be at a particular location at a particular time, the prediction is based at least in part on behavioral data that indicates an intention of the facial recognition candidates to be at a particular location at a particular time, or the facial recognition is performed using facial images provided by one or more of the facial recognition candidates at the time of purchasing a ticket or registering for an event.

6. A method as in claim 5, wherein the prediction is based at least in part on actions by the facial recognition candidates that indicate the intention to be at the particular location at the particular time.

7. A method as in claim 5, wherein the prediction is based at least in part on the behavioral data that indicates the intention of the facial recognition candidates to be at the particular location at the particular time.

8. A method as in claim 5, wherein the facial recognition is performed using the facial images provided by the one or more of the facial recognition candidates at the time of purchasing the ticket or registering for the event.

* * * * *